Figure 1:
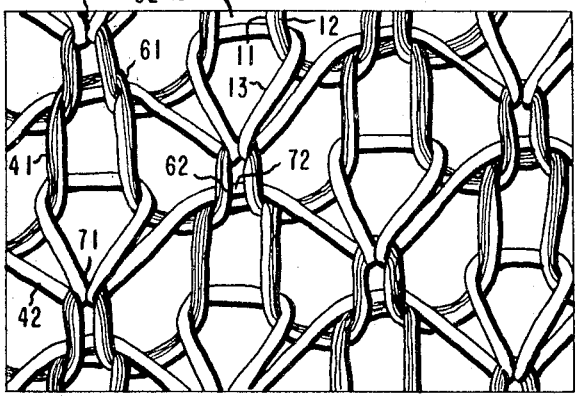
Figure 2:
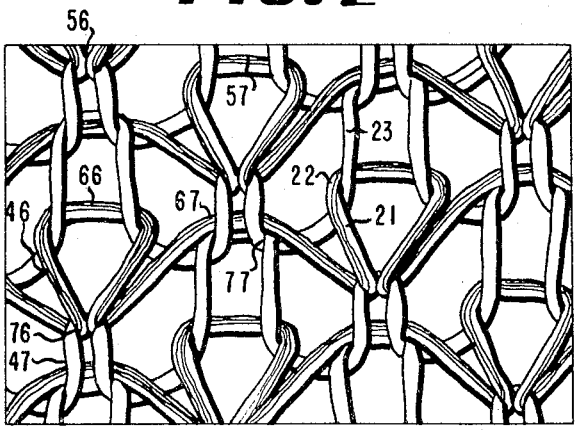
Figure 3:
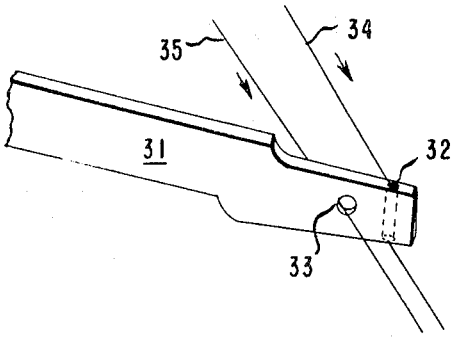

T863003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 999

788,691

KNIT FABRIC

Raymond Joseph Elia, Wilmington, and James Otis Farmer, New Castle, Del., assignors to E. I. du Pont de Nemours and Company, Wilmington, Del., a corporation of Delaware

Continuation of application Ser. No. 541,155, Apr. 8, 1966. This application Dec. 26, 1968. Published June 24, 1969

Int. Cl. D04b *1/18*

U.S. Cl. 66—169

1 Sheet Drawing. 11 Pages Specification

A knit-fabric structure in which a bare elastic yarn and and a first inelastic yarn are knit together in one set of alternating courses and a second inelastic yarn of about the same denier as the first inelastic yarn is knit alone in the other set of alternating courses. The yarn (or yarns) in one set of alternate courses are plain-knit, and the yarn (or yarns) in the other set of alternate courses are in a knit-and-tuck arrangement. In successive courses containing tuck loops, the tuck loops are in alternate wales.

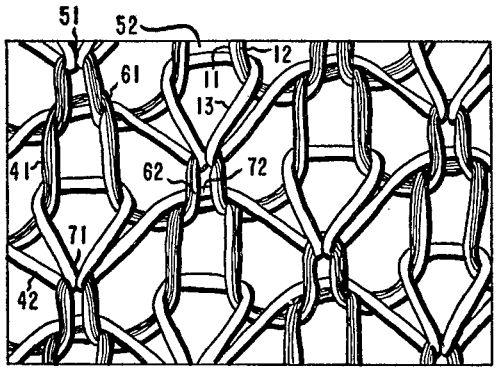

Yarn exposed at the surface of the fabric is predominantly inelastic and the appearance and feel of the fabric approximate the appearance and feel of similar fabrics made only of inelastic yarns.

In knitting the structure, feeding of the bare elastic yarn and inelastic yarn which are knit together is controlled so that the elastic yarn is consistently plaited to the same side (preferably outside) of the inelastic yarn. This is accomplished by using a yarn feed finger having two yarn-guiding eyelets, and passing the yarn to be plaited to the inside through the eyelet which is closer to the needles.

The structure is useful for ladies' sheer, form-fitting elastic stockings. For this purpose, nylon is the preferred inelastic yarn, and spandex is the preferred elastic yarn. Because of the knit-and-tuck arrangement in alternate courses, stockings of this structure exhibit multidirectional stretch, which enhances their form-fitting performance. The structure can also be used in other form-fitting garments, e.g. bathing suits. Where extreme sheerness is not required, covered spandex can also be used.

T863003

June 24, 1969 R. J. ELIA ET AL DEF. PUB.

KNIT FABRIC SN - 788691

Original Filed April 8, 1966

INVENTORS
RAYMOND JOSEPH ELIA
JAMES OTIS FARMER

BY Donald Albers
ATTORNEY